(12) United States Patent
Lee et al.

(10) Patent No.: US 12,209,660 B2
(45) Date of Patent: Jan. 28, 2025

(54) PARKING APPARATUS FOR VEHICLE

(71) Applicant: Hyundai Transys Inc., Seosan-si (KR)

(72) Inventors: Sang Ho Lee, Hwaseong-si (KR); Young Kyu Kim, Hwaseong-si (KR); Hae Jeong Shin, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 0 days.

(21) Appl. No.: 18/439,172

(22) Filed: Feb. 12, 2024

(65) Prior Publication Data

US 2025/0003491 A1    Jan. 2, 2025

(30) Foreign Application Priority Data

Jun. 30, 2023   (KR) .......................... 10-2023-0084834

(51) Int. Cl.
*F16H 63/34*    (2006.01)
*F16H 63/38*    (2006.01)

(52) U.S. Cl.
CPC ......... *F16H 63/3433* (2013.01); *F16H 63/38* (2013.01)

(58) Field of Classification Search
CPC .............................. F16H 63/3433; F16H 63/38
See application file for complete search history.

(56) References Cited

U.S. PATENT DOCUMENTS

| 11,022,218 B2 * | 6/2021 | Schwegler .......... F16H 63/3483 |
| 2020/0248806 A1 | 8/2020 | Klein |
| 2023/0167899 A1 | 6/2023 | Choi et al. |

FOREIGN PATENT DOCUMENTS

| CN | 107725765 B | 6/2020 |
| CN | 112360975 A | 2/2021 |
| DE | 112020007342 T5 | 4/2023 |
| JP | 2022116666 A | 8/2022 |
| KR | 10-2018-0106184 A | 10/2018 |

OTHER PUBLICATIONS

FIT translation DE102018206016A1 (Year: 2018).*
Extended European Search Report dated Aug. 14, 2024 in European Application No. 24156770.0.
Office Action dated Nov. 22, 2024 in Korean Application No. 10-2023-0084834, with machine translation.

* cited by examiner

*Primary Examiner* — Huan Le
(74) *Attorney, Agent, or Firm* — SALIWANCHIK, LLOYD & EISENSCHENK (57) ABSTRACT

A parking apparatus for a vehicle includes a driving part, a detent lever part connected to a central axis of the driving part and rotated in response to a rotation of the central axis, a parking rod part moved in a straight line in response to the rotation of the detent lever part, a sprag part configured to come into contact with the parking rod part and to move up and down in response to the movement of the parking rod part, and a parking gear part disposed over the sprag part, geared by the rise of the sprag part, and configured to have it rotation restricted.

6 Claims, 9 Drawing Sheets

PARKING APPARATUS FOR VEHICLE

CROSS-REFERENCE TO RELATED APPLICATION

This application claims the benefit of Korean Patent Application No. 10-2023-0084834, filed Jun. 30, 2023, the disclosure of which is incorporated by reference herein in its entirety.

BACKGROUND

Field

Exemplary embodiments of the present disclosure relate to a parking apparatus for a vehicle, and more particularly, to a parking apparatus for a vehicle, which can inhibit damage to a parking rod part of a vehicle.

Discussion of the Background

A parking apparatus for a vehicle is constructed in a way that when a driving part operates, the rotation of the parking apparatus is delivered to a manual shaft and a rod assembly assembled with the manual shaft lifts a sprag.

When a parking (P) gear of the vehicle is released in the state in which the vehicle is in a parking (P) gear retention state on a gradient road having a tilt, the parking gear is rotated by strong rotatory power that is generated by parking gear torque due to the gradient or vehicle weight of the vehicle. If the parking gear is disposed in one axis thereof, the parking gear is rotated at a faster angular speed.

At this time, the sprag attempts to go in between the teeth of the parking (P) gear by a restoring force attributable to a rod spring before the rod assembly reaches a location that has deviated from the parking (P) gear, so that racheting occurs between the parking (P) gear and the sprag. The parking function of the parking (P) gear may be lost because the sprag damages the parking rod. Accordingly, it is necessary to improve such racheting.

The Background technology of the present disclosure is disclosed in Korean Patent Application Publication No. 10-2018-0106184 (laid open on Oct. 1, 2018 and entitled "PARKING APPARATUS OF VEHICLE").

SUMMARY

Various embodiments are directed to providing a parking apparatus for a vehicle, which can inhibit damage to a parking rod part of a vehicle.

In an embodiment, a parking apparatus for a vehicle may include a driving part, a detent lever part connected to a central axis of the driving part and rotated in response to a rotation of the central axis, a parking rod part moved in a straight line in response to the rotation of the detent lever part, a sprag part configured to come into contact with the parking rod part and to move up and down in response to the movement of the parking rod part, and a parking gear part disposed over the sprag part, geared by the rise of the sprag part, and configured to have it rotation restricted.

The parking rod part may include a parking rod transfer part geared with the detent lever part and moved forward and backward in response to the rotation of the detent lever part, a parking rod body part mounted on the parking rod transfer part and formed in the length direction of the sprag part, and a parking rod cam part mounted on an end of the parking rod body part and configured to come into contact with the sprag part and move the sprag part up and down.

The parking rod cam part may include a parking rod cam body part mounted on an end of the parking rod body part and formed in a taper shape so that the size of an external diameter of the parking rod cam body part is reduced from the parking rod body part toward the outside of the parking rod cam body part, and a parking cam pipe part mounted on the parking rod cam body part and formed in the form of a cylinder having a diameter smaller than the external diameter of the parking rod cam body part.

The parking rod cam part further includes a cam tilting part that is formed between the parking rod cam body part and the parking cam pipe part and that is formed in a taper shape so that the size of an external diameter of the cam tilting part is reduced from the parking rod cam body part toward the parking cam pipe part.

A tilt angle of the cam tilting part is formed to be greater than a tilt angle of the parking rod cam body part.

The sprag part may include a support body part, a sprag body part rotatably mounted on the support body part, a sprag contact part formed on one side of the sprag body part and configured to come into contact with the parking rod part, a sprag protrusion part formed on the other side of the sprag body part and inserted into the parking gear part when the sprag body part rises up, and a sprag stopper part configured to protrude from the sprag body part and to come into contact with the parking rod cam body part.

The height of the sprag stopper part that protrudes from the sprag body part is set so that the sprag contact part and the parking cam pipe part are constructed to be spaced apart from each other when the sprag stopper part comes into contact with the parking rod cam body part.

The sprag stopper part may be formed to be downward tilted from the support body part toward the sprag contact part along the taper shape of the parking rod cam body part.

According to the parking apparatus for a vehicle according to an embodiment of the present disclosure, although racheting occurs between the sprag part and the parking gear part when the parking (P) gear is released, the sprag part is geometrically robust because the sprag part does not come into direct contact with the parking rod body part of the parking rod part, and can operate normally without affecting a behavior of the parking rod cam part of the parking rod part because the sprag part does not impact on the parking rod cam part of the parking rod part.

Furthermore, according to an embodiment of the present disclosure, a parking operation of a vehicle can be implemented without deforming another part because the sprag stopper part of the sprag part has a structure that makes a line contact with the parking rod cam part.

DETAILED DESCRIPTION OF THE ILLUSTRATED EMBODIMENTS

Hereinafter, a parking apparatus for a vehicle according to embodiments of the present disclosure will be described with reference to the accompanying drawings. In this process, the thicknesses of lines or the sizes of components illustrated in the drawings may have been exaggerated for the clarity of a description and for convenience' sake.

Furthermore, terms to be described below have been defined by taking into consideration their functions in the present disclosure, and may be changed depending on a user or operator's intention or practice. Accordingly, such terms should be defined based on the overall contents of this specification.

Figure 1:
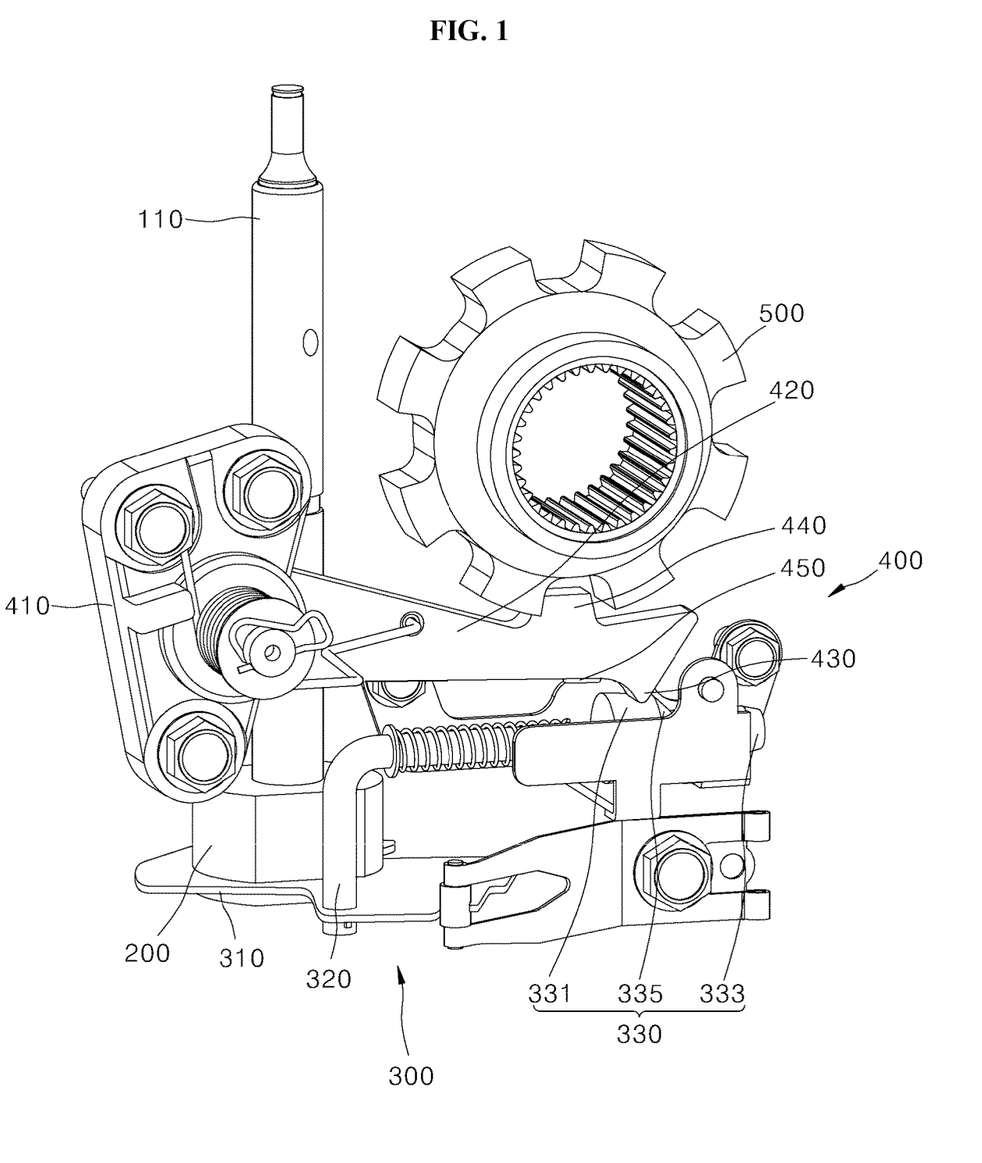
FIG. 1 is a perspective view schematically illustrating a parking apparatus for a vehicle according to an embodiment of the present disclosure.
Figure 2:
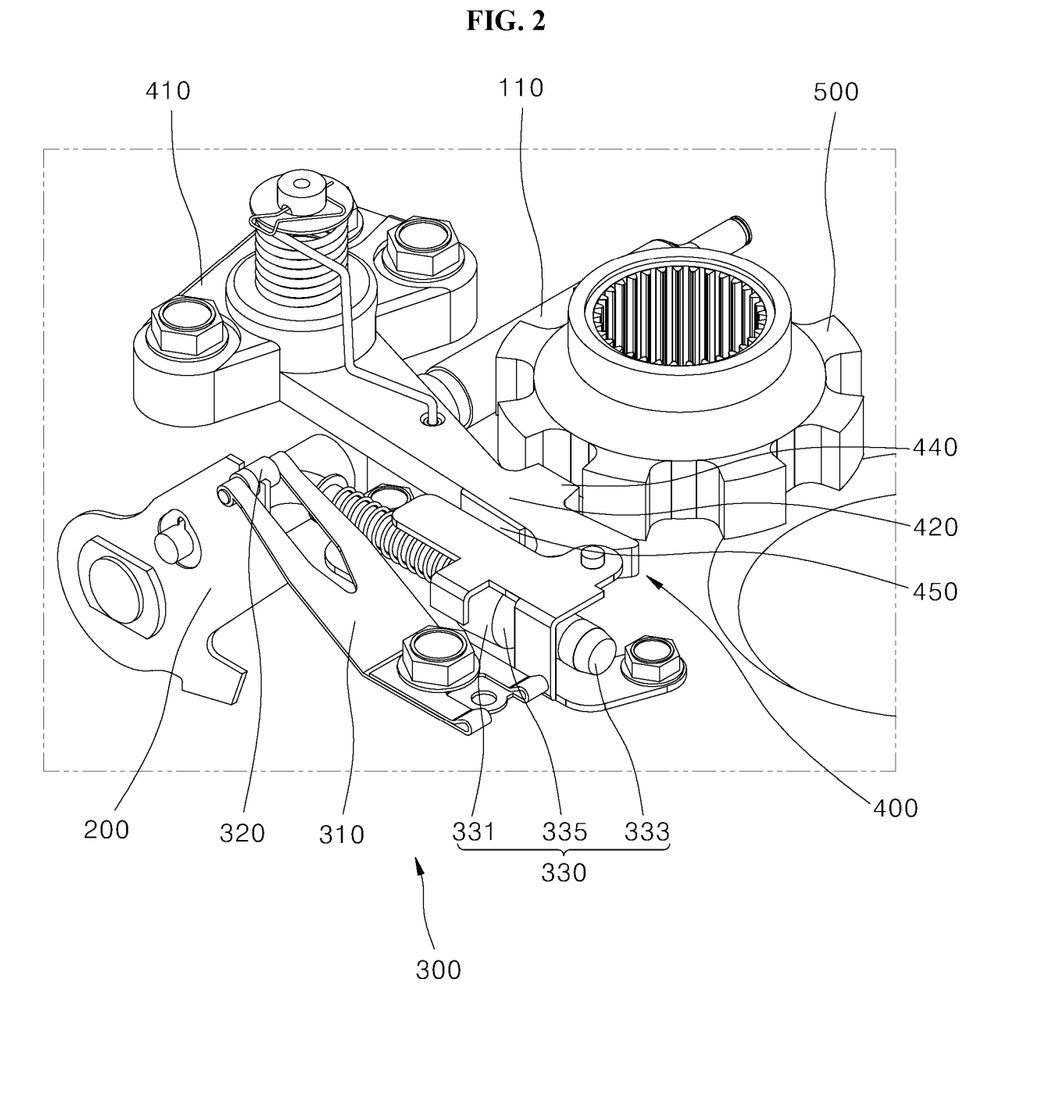
FIG. 2 is a perspective view schematically illustrating major components of the parking apparatus for a vehicle according to an embodiment of the present disclosure.
Figure 3:
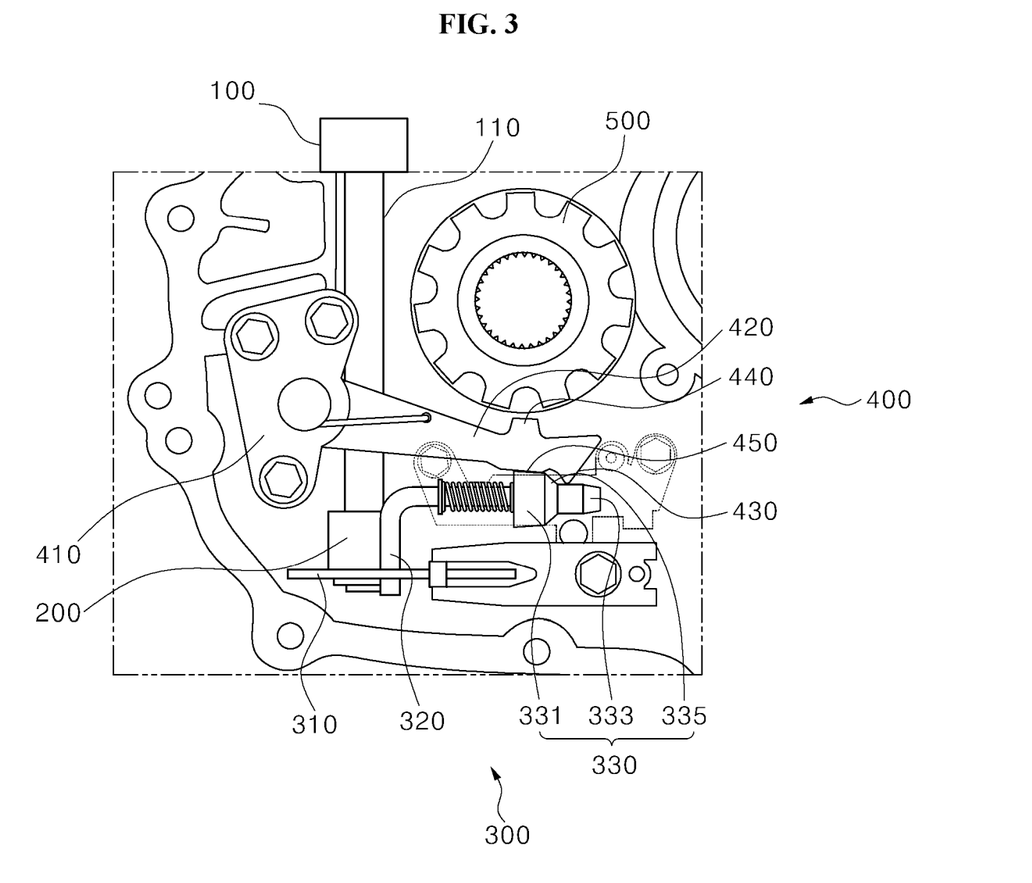
FIG. 3 is a front view schematically illustrating a parking apparatus for a vehicle according to an embodiment of the present disclosure.
Figure 4:
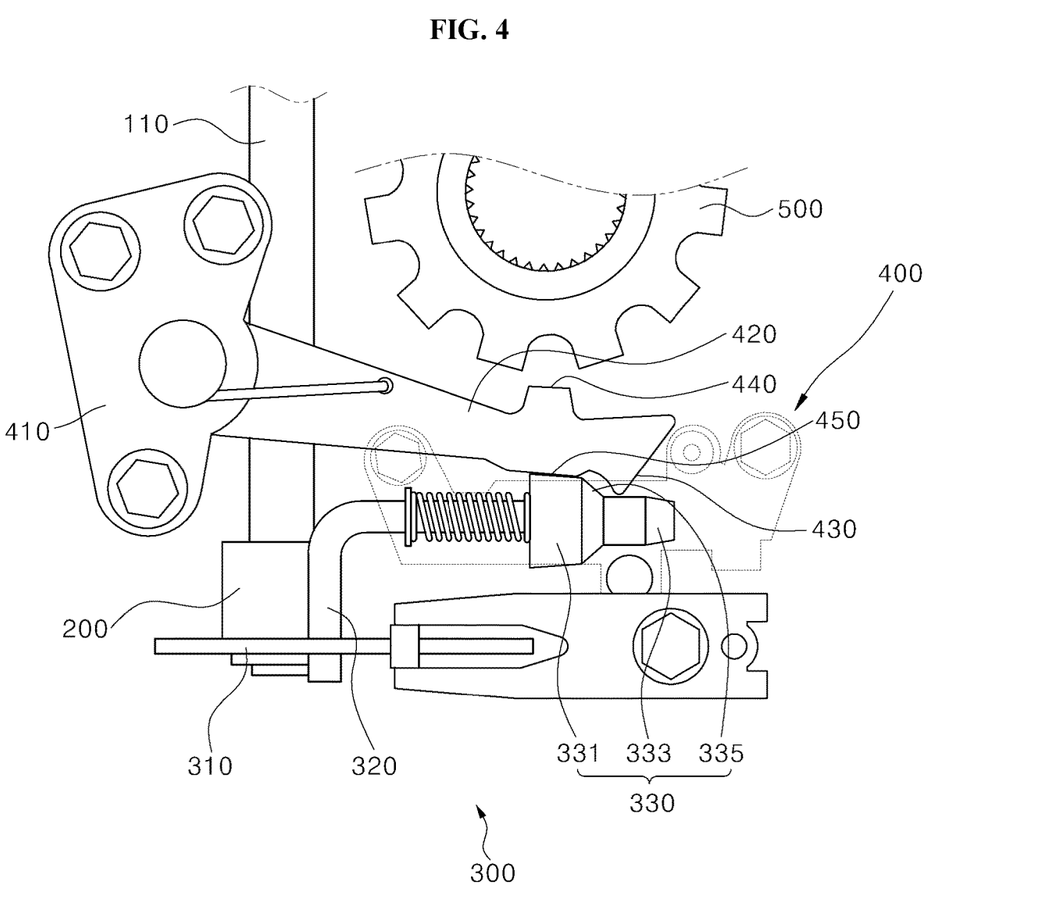
FIG. 4 is a front view schematically illustrating major components of the parking apparatus for a vehicle according to an embodiment of the present disclosure.
Figure 5:
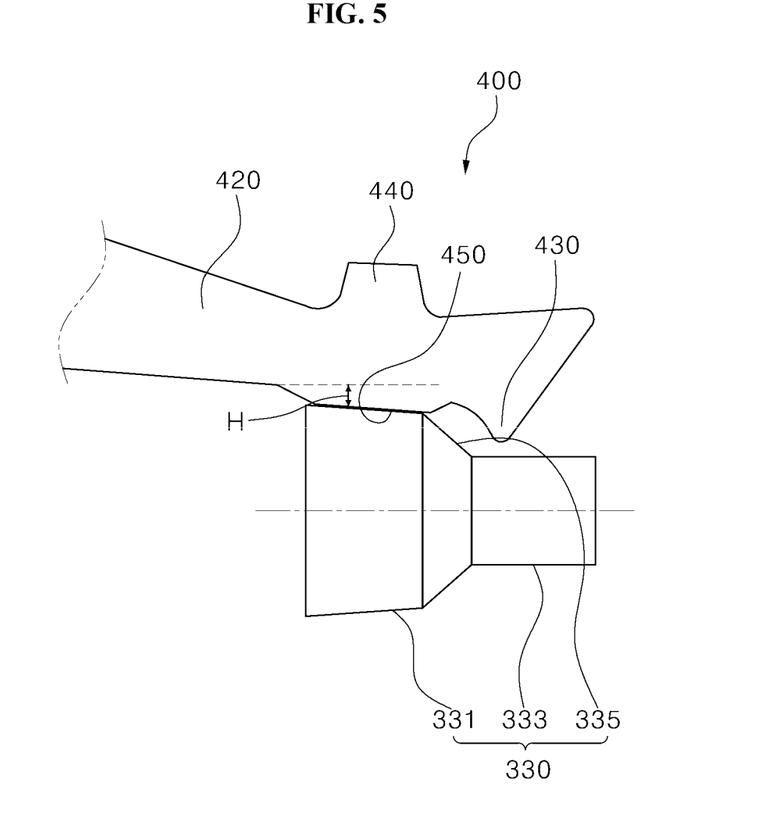
FIG. 5 is a front view schematically illustrating a sprag part and a parking rod cam part of a parking rod part in the parking apparatus for a vehicle according to an embodiment of the present disclosure.
Figure 6:
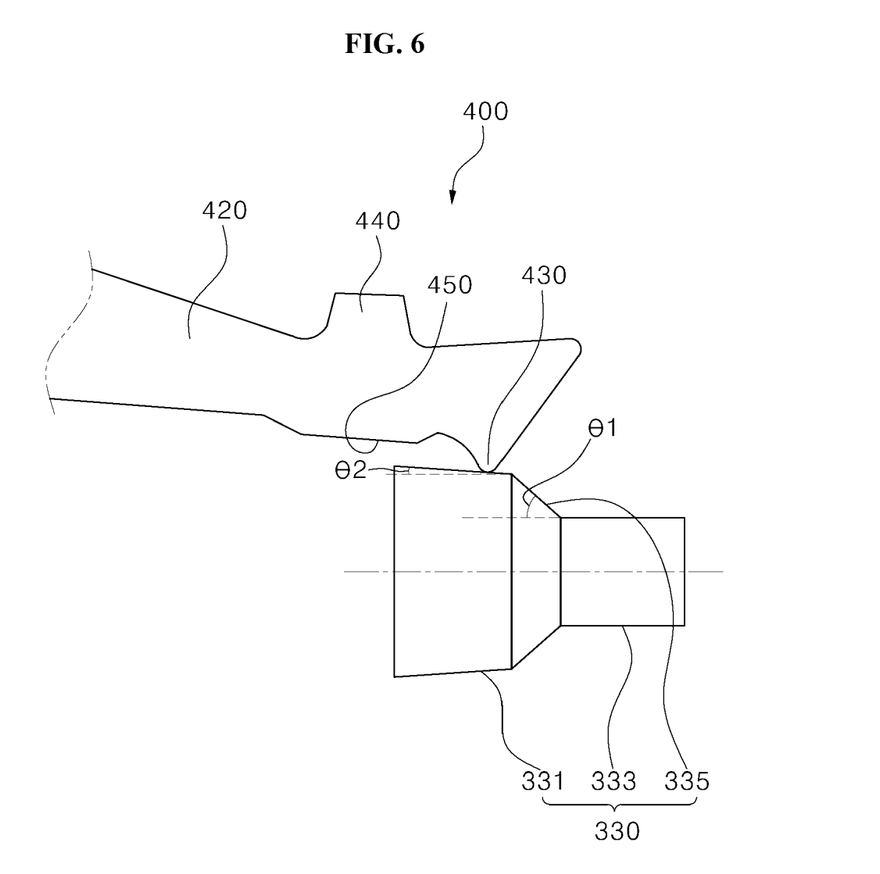
FIG. 6 is a front view schematically illustrating operations of the sprag part and the parking rod cam part of the parking rod part in the parking apparatus for a vehicle according to an embodiment of the present disclosure.
Figure 7:
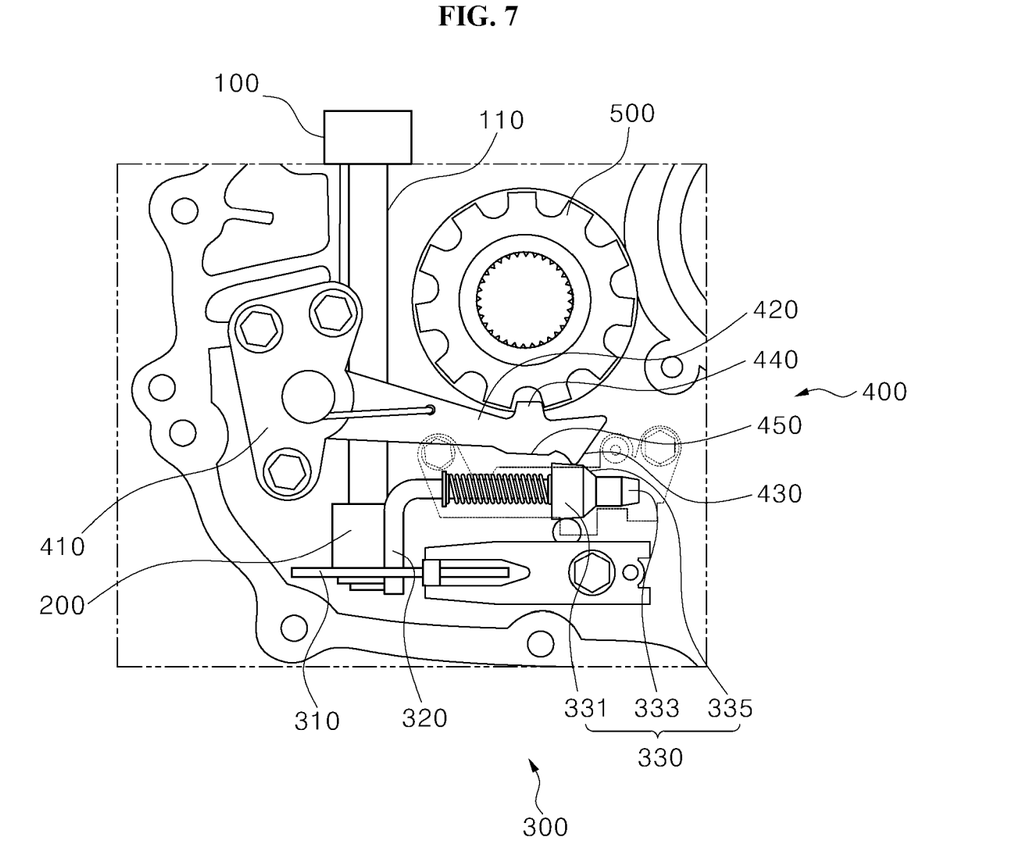
FIG. 7 is a front view schematically illustrating the state in which a vehicle is in a parking (P) gear state in the parking apparatus for a vehicle according to an embodiment of the present disclosure.
Figure 8:
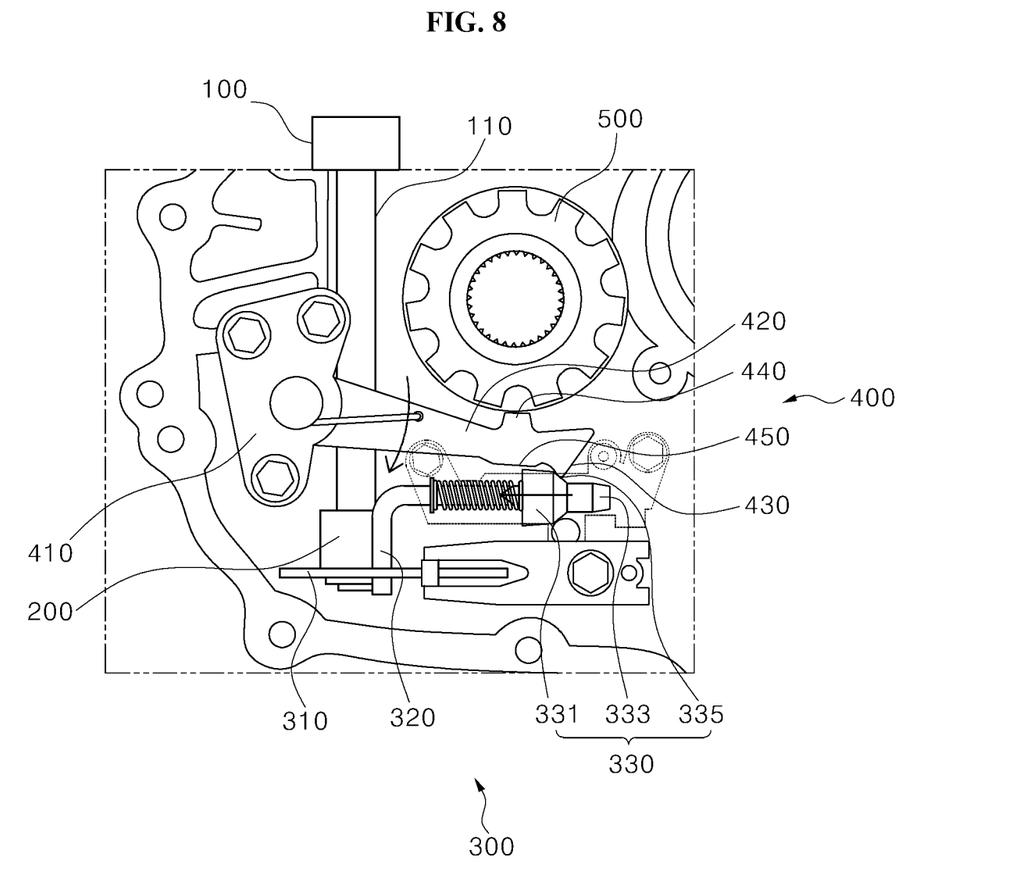
FIG. 8 is a front view schematically illustrating that a vehicle is in a parking (P) gear release state in the parking apparatus for a vehicle according to an embodiment of the present disclosure.
Figure 9:
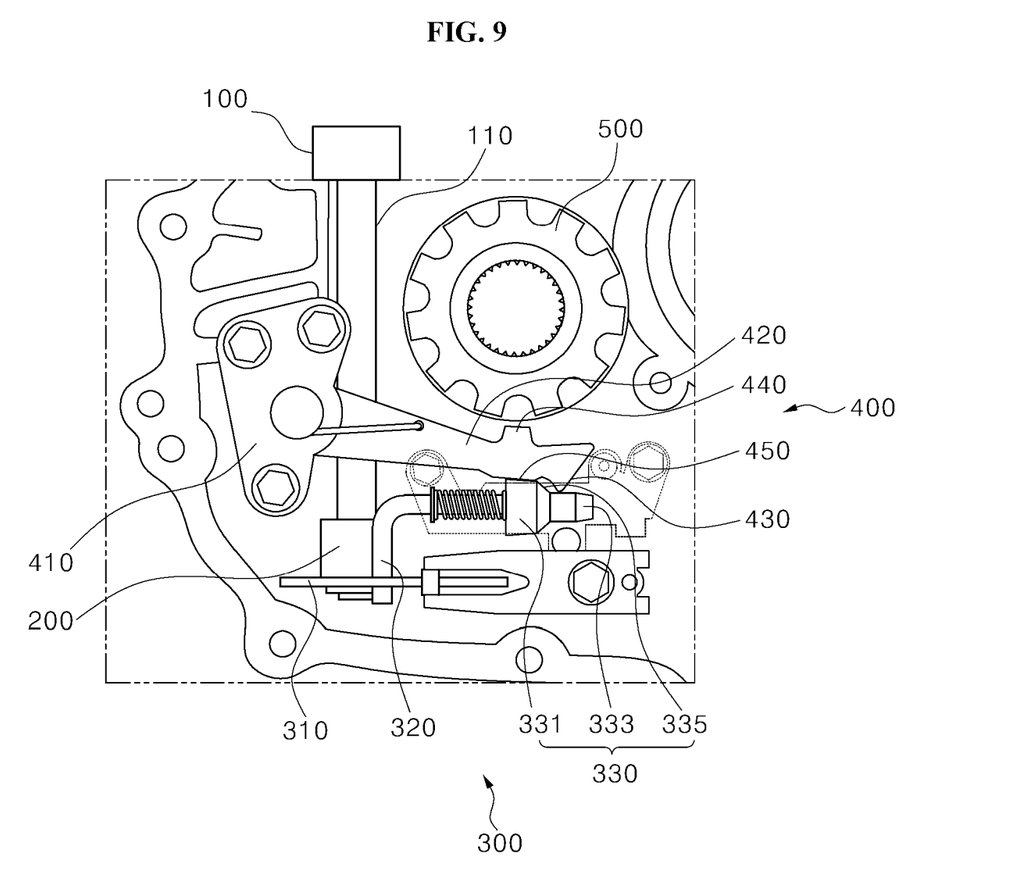
FIG. 9 is a front view schematically illustrating the state in which a vehicle is in the parking (P) gear release state in the parking apparatus for a vehicle according to an embodiment of the present disclosure.

FIG. 1 is a perspective view schematically illustrating a parking apparatus for a vehicle according to an embodiment of the present disclosure. FIG. 2 is a perspective view schematically illustrating major components of the parking apparatus for a vehicle according to an embodiment of the present disclosure. FIG. 3 is a front view schematically illustrating a parking apparatus for a vehicle according to an embodiment of the present disclosure. FIG. 4 is a front view schematically illustrating major components of the parking apparatus for a vehicle according to an embodiment of the present disclosure. FIG. 5 is a front view schematically illustrating a sprag part and a parking rod cam part of a parking rod part in the parking apparatus for a vehicle according to an embodiment of the present disclosure. FIG. 6 is a front view schematically illustrating operations of the sprag part and the parking rod cam part of the parking rod part in the parking apparatus for a vehicle according to an embodiment of the present disclosure. FIG. 7 is a front view schematically illustrating the state in which a vehicle is in a parking (P) gear state in the parking apparatus for a vehicle according to an embodiment of the present disclosure. FIG. 8 is a front view schematically illustrating that a vehicle is in a parking (P) gear release state in the parking apparatus for a vehicle according to an embodiment of the present disclosure. FIG. 9 is a front view schematically illustrating the state in which a vehicle is in the parking (P) gear release state in the parking apparatus for a vehicle according to an embodiment of the present disclosure.

Referring to FIGS. 1 to 9, the parking apparatus for a vehicle according to an embodiment of the present disclosure may include a driving part 100, a detent lever part 200, a parking rod part 300, a sprag part 400, and a parking gear part 500.

The driving part 100 may be operated by a knob (not illustrated) that is mounted on a driver's seat. The driving part 100 may consist of an actuator and a motor having a central axis 110. The central axis 110 of the driving part 100 may be connected to the detent lever part 200.

The detent lever part 200 may be connected to the central axis 110 of the driving part 100, and may be rotated in response to the rotation of the central axis 110.

The detent lever part 200 may be engaged with a parking rod transfer part 310 of the parking rod part 300. The rotated detent lever part 200 may be restricted by a spring 250 by a certain degree or more. The detent lever part 200 may return to its original location by the spring 250. The spring 250 may have one side fixed to a housing and the other side connected to the detent lever part 200.

The parking rod part 300 may be moved in a straight line in response to the rotation of the detent lever part 200. The parking rod part 300 may be engaged with the gear of the detent lever part 200, and may be moved forward and backward in a straight line in response to the rotation of the detent lever part 200.

The parking rod part 300 may include the parking rod transfer part 310, a parking rod body part 320, and a parking rod cam part 330. The parking rod transfer part 310 may be geared with the detent lever part 200, and may be moved forward and backward (on the basis of FIGS. 1 and 3) in response to the rotation of the detent lever part 200.

The parking rod transfer part 310 is composed of a rack gear. Accordingly, the parking rod transfer part 310 that consists of the rack gear may be moved forward and backward in a straight line with respect to the detent lever part 200 that is rotated.

The parking rod body part 320 may be mounted on the parking rod transfer part 310, and may be formed of a body having a long shape in the length direction of the sprag part 400. The parking rod body part 320 may be formed to be bent in a "L" form in order to avoid interference with a surrounding component.

The parking rod cam part 330 may be mounted on an end (on a right end on the basis of FIG. 4) of the parking rod body part 320, may come into contact with the sprag part 400, and may move the sprag part 400 up and down. A surface of the parking rod cam part 330, which comes into contact with the sprag part 400 as the parking rod body part 320 is moved forward and backward, may be formed to a different external diameter. Accordingly, the sprag part 400 may be moved up and down as the sprag part 400 comes into contact with the parking rod cam part 330.

The parking rod cam part 330 may include a parking cam body part 331 and a parking cam pipe part 333. The parking cam body part 331 may be mounted on the end (on the right end on the basis of FIG. 4) of the parking rod body part 320, and may be formed in a taper shape so that the size of the external diameter of the parking cam body part 331 is reduced from the parking rod body part 320 to the outside thereof.

The parking cam body part 331 may be tapered from the end of the parking rod body part 320 toward the outside (on the right side on the basis of FIG. 4) thereof, so that the size of the external diameter of the parking cam body part 331 may be reduced. That is, the size of the external diameter of the parking cam body part 331 may be reduced from the parking rod body part 320 toward the parking cam pipe part 333. Accordingly, the parking cam body part 331 may be formed to be downward tilted from the parking rod body part 320 toward the parking cam pipe part 333.

The parking cam body part 331 may be tapered so that the external diameter thereof is gradually reduced, may make a line contact with a sprag stopper part 450 of the sprag part 400, and thus can protect the parking rod part 300 although racheting occurs between the parking cam body part 331 and the sprag stopper part 450.

The parking cam pipe part 333 may be mounted on the parking cam body part 331, and may be formed in the form of a cylinder having a diameter smaller than the external diameter of the parking cam body part 331. The parking cam pipe part 333 may come into contact with a sprag contact part 430 of the sprag part 400.

The parking rod cam part 330 may further include a cam tilting part 335. The cam tilting part 335 may be formed between the parking rod cam body part 331 and the parking cam pipe part 333, and may be formed in a taper shape so that the size of the external diameter of the cam tilting part 335 is reduced from the parking rod cam body part 331 toward the parking cam pipe part 333.

The sprag stopper part 450 may come into contact with a surface of the cam tilting part 335. The cam tilting part 335 is formed in the taper shape so that the size of the external diameter of the cam tilting part 335 is reduced from the parking rod cam body part 331 toward the parking cam pipe part 333. Accordingly, an impact on the sprag stopper part 450 can be reduced because the contact area and contact time of the sprag stopper part 450 are increased as the sprag contact part 430 is moved along the surface of the cam tilting part 335.

A tilt angle θ1 of the cam tilting part 335 may be formed to be greater than a tilt angle θ2 of the parking rod cam body part 331. Since the tilt angle θ1 of the cam tilting part 335 is formed to be greater than the tilt angle θ2 of the parking rod cam body part 331, the sprag contact part 430 is moved along the surface of the parking rod cam body part 331 and moved to the cam tilting part 335, and the contact area and contact time of the sprag stopper part 450 with the parking rod cam body part 331 can be increased.

The sprag part 400 may come into contact with the parking rod part 300, and may be moved up and down in response to a movement of the parking rod part 300.

The sprag part 400 may come into contact with the parking rod part 300, and may be moved up and down in response to a movement of the parking rod part 300. The sprag part 400 may rise and come into contact with the parking gear part 500, and may restrict the rotation of the parking gear part 500. That is, when the rotation of the parking gear part 500 is restricted by the sprag part 400, a vehicle may be in a parking (P) gear state.

When the sprag part 400 falls and deviates from the parking gear part 500, the parking gear part 500 may be rotated. That is, when the sprag part 400 deviates from the parking gear part 500, the vehicle may not be in the parking (P) gear state.

The sprag part 400 may include a support body part 410, a sprag body part 420, the sprag contact part 430, the sprag protrusion part 440, and the sprag stopper part 450.

The support body part 410 is mounted on the housing, and may rotatably support the sprag body part 420.

The sprag body part 420 may have one end (a left end on the basis of FIG. 4) rotatably mounted on the support body part 410. The sprag body part 420 may be rotated around the support body part 410 when the sprag contact part 430 is moved up and down along a surface of the sprag contact part 430, which comes into contact with the parking rod cam part 330 of the parking rod part 300.

The sprag contact part 430 may be formed to protrude from one side (a lower side on the basis of FIG. 4) of the sprag body part 420, and may come into contact with the parking rod part 300. As the sprag contact part 430 passes through the parking rod cam body part 331 and parking cam pipe part 333 of the parking rod cam part 330, the sprag part 400 may be moved up and down.

The sprag part 400 may rise as the sprag contact part 430 is moved from the parking cam pipe part 333 toward the parking rod cam body part 331, and may fall as the sprag contact part 430 is moved from the parking rod cam body part 331 to the parking cam pipe part 333.

As the sprag contact part 430 passes through the parking cam body part 331 and parking cam pipe part 333 of the parking rod cam part 330, the sprag body part 420 of the sprag part 400 may be moved up and down. That is, the sprag contact part 430 may rise as the sprag contact part 430 is moved from the parking cam pipe part 333 toward the parking cam body part 331, and may fall as the sprag contact part 430 is moved from the parking cam body part 331 toward the parking cam pipe part 333.

The sprag protrusion part 440 may be formed to protrude from the other side (an upper side on the basis of FIG. 4) of the sprag body part 420, and may be inserted into the parking gear part 500 when the sprag body part 420 rises. The sprag protrusion part 440 may deviate from the parking gear part 500 when the sprag body part 420 falls. When the sprag protrusion part 440 is inserted into the parking gear part 500, the rotation of the parking gear part 500 may be restricted.

The sprag stopper part 450 may protrude from the bottom (on the basis of FIG. 4) of the sprag body part 420, and may come into contact with the parking rod cam body part 331. The sprag stopper part 450 may be formed to be downward tilted from the support body part 410 toward the sprag contact part 430 along the taper shape of the parking rod cam body part 331.

The sprag stopper part 450 may make a line contact with the parking cam body part 331, and can protect the parking rod part 300 although racheting occurs between the sprag stopper part 450 and the parking cam body part 331.

The height H of the sprag stopper part 450 that protrudes from the sprag body part 420 may be set so that the sprag contact part 430 and the parking cam pipe part 333 are spaced apart from each other when the sprag stopper part 450 comes into contact with the parking rod cam body part 420.

An impact on the sprag contact part 430 and the occurrence of noise in the sprag contact part 430, occurring when the sprag contact part 430 comes into contact with the parking cam pipe part 333, can be inhibited because the height H of the sprag stopper part 450 that protrudes from the sprag body part 420 when the sprag stopper part 450 comes into contact with the parking rod cam body part 420 is set so that the sprag contact part 430 and the parking cam pipe part 333 are spaced apart from each other.

A plurality of gears is formed in an outer surface of the parking gear part 500. The parking gear part 500 may be disposed over the sprag part 400. The rotation of the parking gear part 500 may be restricted as the sprag protrusion part 440 of the sprag part 400 is inserted and engaged with the gears of the parking gear part 500 by the rise of the sprag part 400.

That is, the rotation of the parking gear part 500 may be restricted by the sprag protrusion part 440 of the sprag part 400. When the sprag protrusion part 440 deviates from the parking gear part 500, the parking gear part 500 may be rotated. The parking gear part 500 can maintain the parking state (i.e., the parking (P) gear state) of the vehicle because the rotation of the parking gear part 500 is restricted by the sprag protrusion part 440 of the sprag part 400.

An operation of the parking apparatus for a vehicle according to an embodiment of the present disclosure is described with reference to FIGS. 7 to 9.

FIG. 7 is a front view schematically illustrating the state in which a vehicle is in the parking (P) gear state in the parking apparatus for a vehicle. Referring to FIG. 7, the detent lever part 200 may be rotated by the driving part 100. The parking rod body part 320 may be moved in a left direction thereof by the gearing of the detent lever part 200 and the parking rod transfer part 310 of the parking rod part 300. As the parking rod body part 320 is moved, a location of the sprag protrusion part 440 of the sprag part 400 at which the sprag protrusion part 440 comes into contact with the parking cam pipe part 333 is changed.

That is, as the sprag protrusion part 440 of the sprag part 400 is moved from the parking cam body part 331 toward the parking cam pipe part 333, the sprag body part 420 may be rotated around the support body part 410, so that the sprag part 400 may fall.

The sprag stopper part 450 may be formed along the taper shape of the parking rod cam body part 331. Accordingly, the sprag stopper part 450 may be moved while making a line contact with the parking rod cam body part 331.

Referring to FIG. 9, the sprag protrusion part 440 of the sprag part 400 that has fallen may be separated from the parking gear part 500.

According to the parking apparatus for a vehicle according to an embodiment of the present disclosure, although racheting occurs between the sprag part 400 and the parking gear part 500 when the parking (P) gear is released, the sprag part 400 is geometrically robust because the sprag part 400 does not come into direct contact with the parking rod body part 320 of the parking rod part 300, and can operate normally without affecting a behavior of the parking rod cam part 330 of the parking rod part 300 because the sprag part 400 does not impact on the parking rod cam part 330 of the parking rod part 300.

Furthermore, according to an embodiment of the present disclosure, a parking operation of a vehicle can be implemented without deforming another component because the sprag stopper part 450 of the sprag part 400 has a structure that makes a line contact with the parking rod cam part 330.

The present disclosure has been described above based on the embodiments illustrated in the accompanying drawings, but the embodiments are merely illustrative. A person having ordinary knowledge in the art to which the present disclosure pertains will understand that various modifications and other equivalent embodiments are possible from the embodiments. Accordingly, the technical range of protection of the present disclosure should be determined by the claims.

What is claimed is:

1. A parking apparatus for a vehicle, comprising:
a driving part;
a detent lever part connected to a central axis of the driving part and rotated in response to a rotation of the central axis;
a parking rod part moved in a straight line in response to the rotation of the detent lever part;
a sprag part configured to come into contact with the parking rod part and to move up and down in response to movement of the parking rod part; and
a parking gear part disposed over the sprag part, geared by a rise of the sprag part, and configured to have its rotation restricted,
wherein the parking rod part comprises:
a parking rod transfer part geared with the detent lever part and configured to move forward and backward in response to rotation of the detent lever part;
a parking rod body part mounted on the parking rod transfer part and formed in a length direction of the sprag part; and
a parking rod cam part mounted on a first end of the parking rod body part and configured to come into contact with the sprag part and move the sprag part up and down, wherein the parking rod body part comprises:
a first portion extending away from the parking rod transfer part in a first direction parallel to the central axis, the first portion comprising a second end of the parking rod body part; and
a second portion extending from the first portion of the parking rod body part in a second direction perpendicular to the central axis, the second portion comprising the first end of the parking rod body part,
wherein the parking rod cam part comprises a parking rod cam body part mounted on the first end of the parking rod body part and formed in a taper shape so that a size of an external diameter of the parking rod cam body part is reduced from the parking rod body part toward an outside of the parking rod cam body part,
wherein the sprag part comprises a sprag body part and a sprag stopper part that protrudes from the sprag body part, the sprag stopper part being configured to come into contact with the parking rod cam body part, and
wherein the sprag stopper part has a taper shape that matches that of the parking rod cam body part.

2. The parking apparatus of claim 1, wherein the parking rod cam part further comprises: a parking cam pipe part mounted on the parking rod cam body part and formed in a form of a cylinder having a diameter smaller than the external diameter of the parking rod cam body part.

3. The parking apparatus of claim 2, wherein the parking rod cam part further comprises a cam tilting part that is formed between the parking rod cam body part and the parking cam pipe part and that is formed in a taper shape so that a size of an external diameter of the cam tilting part is reduced from the parking rod cam body part toward the parking cam pipe part.

4. The parking apparatus of claim 3, wherein a tilt angle of the cam tilting part is formed to be greater than a tilt angle of the parking rod cam body part.

5. The parking apparatus of claim 2, wherein the sprag part comprises:
a support body part;
the sprag body part rotatably mounted on the support body part;
a sprag contact part formed on one side of the sprag body part and configured to come into contact with the parking rod part; and
a sprag protrusion part formed on an other side of the sprag body part and inserted into the parking gear part when the sprag body part rises up.

6. The parking apparatus of claim 1, wherein a height of the sprag stopper part that protrudes from the sprag body part is set so that the sprag contact part and the parking cam pipe part are constructed to be spaced apart from each other when the sprag stopper part comes into contact with the parking rod cam body part.

\* \* \* \* \*